(12) United States Patent
Lee et al.

(10) Patent No.: US 7,583,454 B1
(45) Date of Patent: Sep. 1, 2009

(54) FOCUS ADJUSTMENT MODULE

(75) Inventors: Tsu-Meng Lee, Taichung (TW);
Shen-Jui Chao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/277,400

(22) Filed: Nov. 25, 2008

(30) Foreign Application Priority Data

Sep. 5, 2008 (TW) .............................. 97134152 A

(51) Int. Cl.
*G02B 7/02* (2006.01)
(52) U.S. Cl. ...................................... 359/823
(58) Field of Classification Search ................. 359/823, 359/824, 694; 369/44.11–44.17, 44.29; 720/662, 720/683; 355/58; 348/340
See application file for complete search history.

(56) References Cited

U.S. PATENT DOCUMENTS 4,913,527 A * 4/1990 Jessop ........................ 359/823

7,540,004 B2 * 5/2009 Lee et al. ..................... 720/662

* cited by examiner

*Primary Examiner*—Loha Ben
(74) *Attorney, Agent, or Firm*—Thomas, Kayden, Horstemeyer & Risley

(57) ABSTRACT

A focus adjustment module is disclosed and includes a first optical element disposed along an optical axle, a guiding track unit, a guiding unit and a controller. The guiding unit includes a holder for the optical element to be assembled thereon and a flexible member to connect to the holder. The flexible member includes an inner section to connect to the holder, an outer section and a middle controlling section. The controller moves along a control path intersecting the optical axle. The middle controlling section is sustained in a non-deformed state non-parallel to the control path. When moving from the initial position to the control position, the controller moves from the outer section to the middle controlling section to force the middle controlling section to become deformed and to link to the optical element and move it between the origin and the focus adjustment point along the optical axle.

18 Claims, 6 Drawing Sheets

# FOCUS ADJUSTMENT MODULE

CROSS REFERENCE TO RELATED APPLICATIONS

This Application claims priority of Taiwan Patent Application No. 97134152, filed on Sep. 5, 2008, the entirety of which is incorporated by reference herein.

BACKGROUND OF THE INVENTION

1. Field of the Invention

The invention relates to an optical module, and more particularly to a focus adjustment module to adjust the intervals between optical elements.

2. Description of the Related Art

In optical apparatuses, for example a projector, a video recorder or a camera, the intervals between lenses, or a lens and an imaging sensor are used for zooming and focusing.

Referring to FIGS. 1 and 2, a conventional focus adjustment module 1 which is telescopic along an optical axle L includes a zooming motor 11, a cam 12 disposed along the optical axle L, a first lens unit 13, a second lens unit 14, a sleeve 15 disposed along the optical axle L, a focusing motor 16, a lead screw 17 disposed on the focusing motor 16, a focusing lens unit 18 and an imaging sensor 19.

The first lens unit 13 comprises a plurality of first linking pins 131 passing through the sleeve 15 and the cam 12. The second lens unit 14 comprises a plurality of second linking pins 141 passing through the sleeve 15 and the cam 12. When the zooming motor 11 drives the cam 12 to rotate, the first linking pins 131 and the second linking pins 141 link the first lens unit 13 and the second lens unit 14 to move along the optical axle L for zooming relative to the imaging sensor 19.

When focusing, the focusing motor 16 drives the lead screw 17 to adjust the interval between the focusing lens unit 18 and an imaging sensor 19 for focusing.

Thus, the cam 12 and the sleeve 15 must be linked to the first linking pins 131 and the second linking pins 141, and the lead screw 17 must be linked to the focusing lens unit 18 so that the positions of the first lens unit 13, the second lens unit 14 and the focusing lens unit 18 on the optical axial L are adjusted. As such, the conventional focus adjustment module 1 needs many elements and the volume thereof is large. Additionally, the cost for a highly precise cam 12 is very high. At present, a piezoelectric material and a liquid lens can be used to manufacture the focus adjustment module 1. However, the cost is also very high and the application field is limited.

BRIEF SUMMARY OF THE INVENTION

The invention provides a focus adjustment module with reduced volume, while easily accomplishing the purpose of focus adjustment.

The focus adjustment module of the invention comprises a first optical element, a guiding track unit, a first guiding unit and a control unit.

The first optical element is disposed along an optical axle. The guiding track unit is disposed parallel to the optical axle.

The first guiding unit guides the first optical element to move along the optical axle and comprises a first holder to fix the guiding track unit, wherein the first optical element is assembled thereon, and a first flexible member is connected to and drives the first holder. The first flexible member comprises a first inner section to connect to the first holder, a first outer section opposite to the first inner section and a first middle controlling section between the first inner section and the first outer section.

The control unit comprises a controller to fix the first flexible member and a power supply to drive the controller to intersect with the optical axle along a control path. The controller moves between an initial position furthest away from the optical axle and a control position closest to the optical axle. When the controller is at the initial position, the controller disposed on the first outer section. The first middle controlling section is sustained in a non-deformed state nonparallel to the control path. The first optical element is disposed on an origin on the optical axle. When the controller is at the control position, the controller moves from the first outer section to the first middle controlling section to force the first middle controlling section to become deformed. The first optical element disposed on a focus adjustment point on the optical axle.

The efficacy of the invention is to make the controller on the first flexible element to move along the control path, further, to drive the first optical element on the guiding track unit to move along the optical axle between the origin and the focus adjustment point to simplify the link structure and reduce the volume. Thus, the focus adjustment module of the invention easily accomplishes the purpose of focus adjustment.

The invention can be more fully understood by reading the subsequent detailed description and examples with references made to the accompanying drawings, wherein:

DETAILED DESCRIPTION OF THE INVENTION

Note that the same elements are marked by the same numbers.

Figure 1:
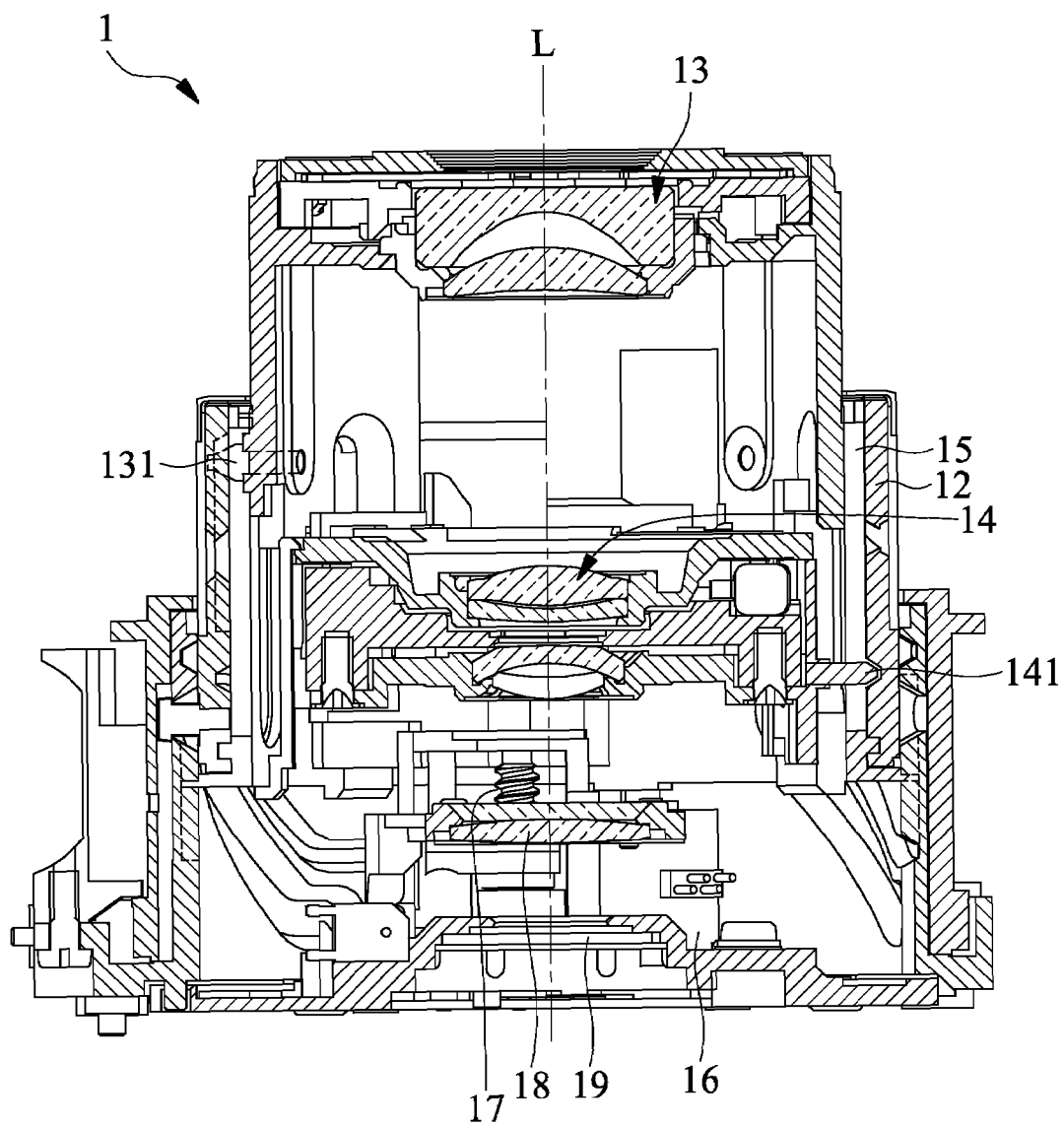
FIG. 1 is a lateral view of a conventional focus adjustment module.
Figure 2:
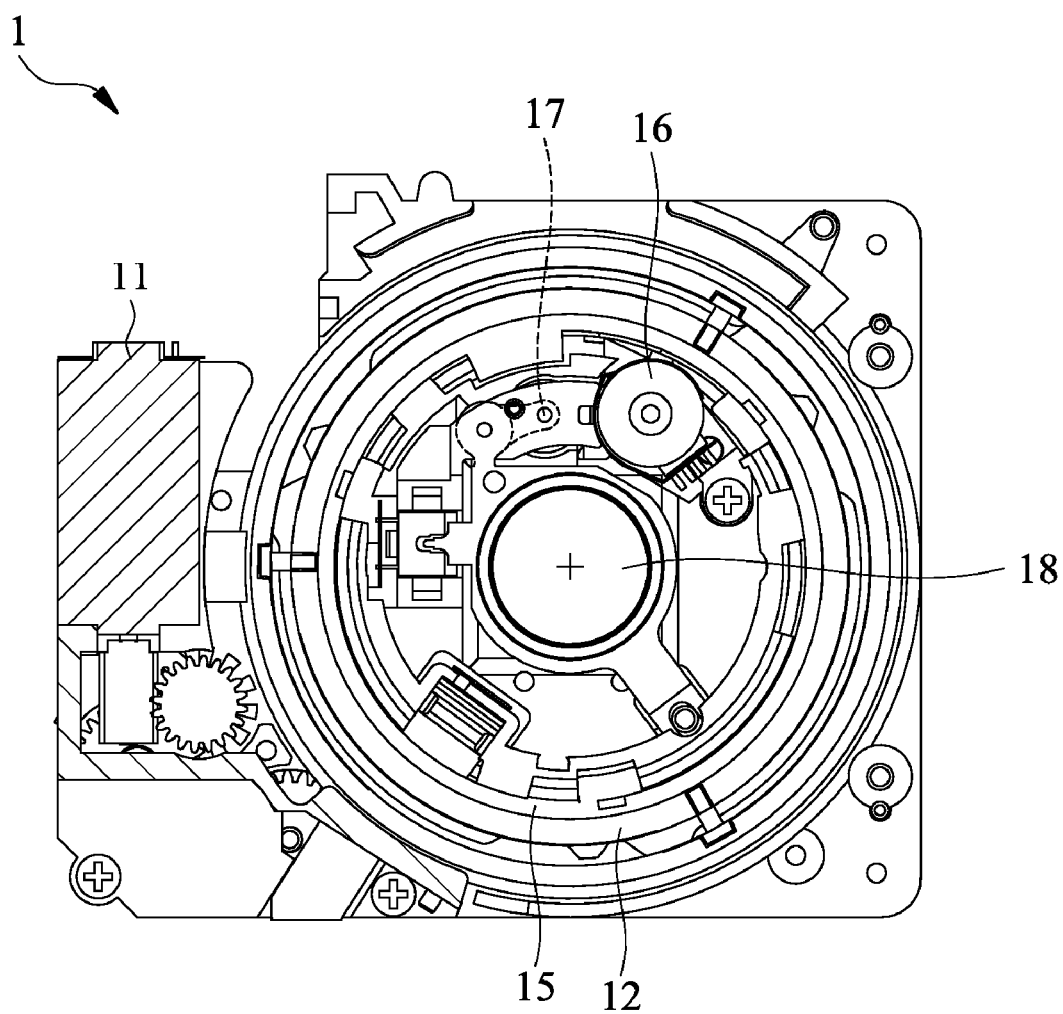
FIG. 2 is a vertical view of a conventional focus adjustment module.
Figure 3:
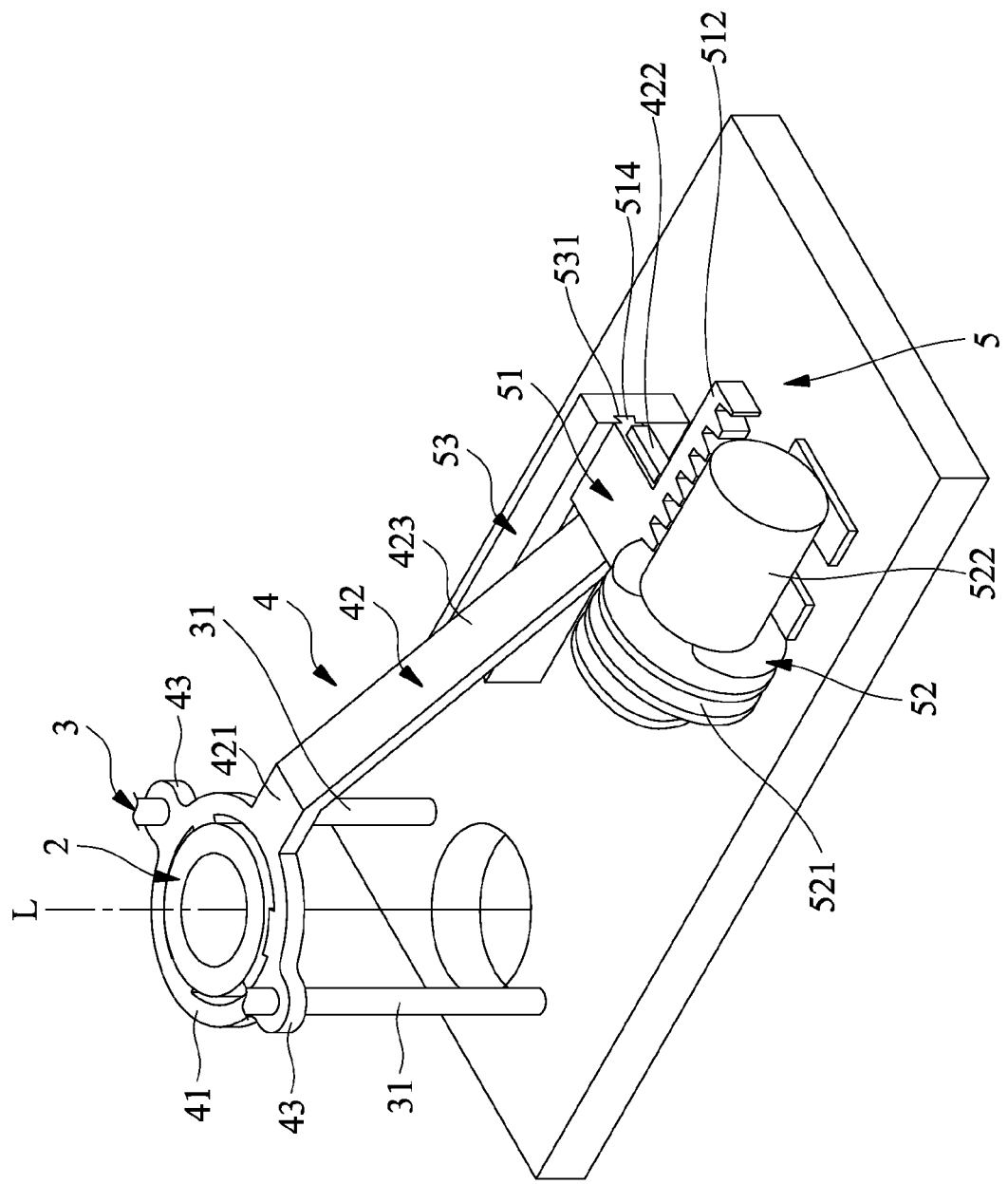
FIG. 3 is schematic view showing a focus adjustment module of an embodiment of the invention.
Figure 4:
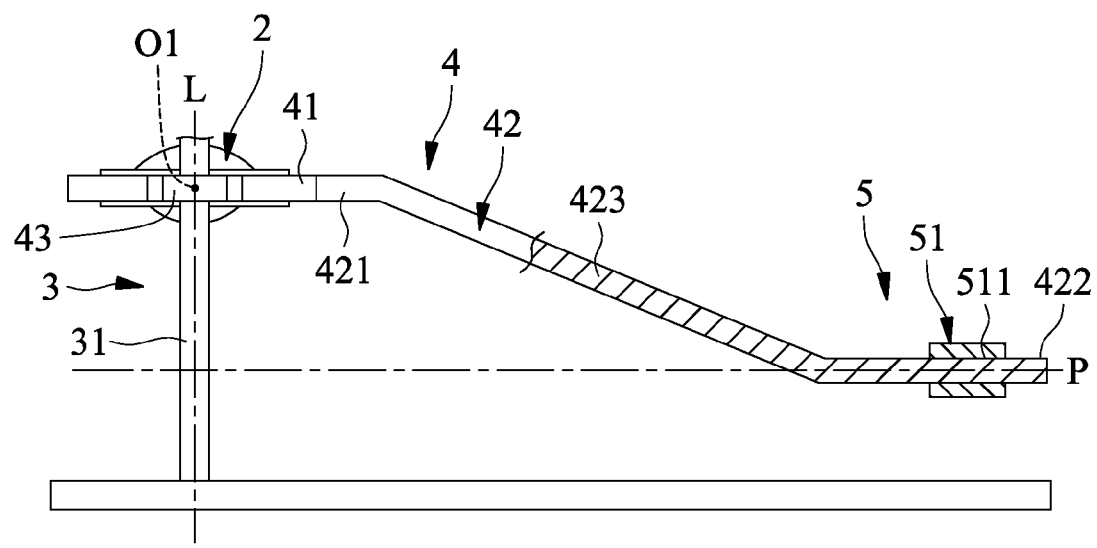
FIG. 4 is a lateral view showing a controller disposed at an initial position furthest away from an optical axle.

Referring to FIGS. 3 and 4, the focus adjustment module of an embodiment of the invention comprises a first optical element 2, a guiding track unit 3, a first guiding unit 4 and a control unit 5.

The first optical 2 is disposed along an optical axle L. In this embodiment, the first optical element 2 is an optical lens.

The guiding unit 3 comprises a pair of guiding axles 31. The guiding axles 31 are disposed parallel to the optical axle L.

The guiding unit 4 guides the first optical element 2 to move along the optical axle L. The guiding unit 4 comprises a first holder 41 for the first optical element 2 to be assembled thereon, a first flexible member 42 to connect to and drive the first holder 41 and a pair of first pivoting portion 43 on the first holder 41 opposite to the guiding axles 31. The first pivoting portion 43 fixes the guiding axles 31 to make the first holder 41 move along the guiding axles 31 via the first pivoting portion 43.

The first flexible member 42 is a steel sheet with good mechanical performance suitable for elements which are repetitionally used. The first flexible member 42 comprises a first inner section 421 to connect to the first holder 41, a first outer section 422 opposite to the first inner section 421 and a first middle controlling section 423 between the first inner section 421 and the first outer section 422.

The control unit 5 comprises a controller 51 to fix the first flexible member 42, a power supply 52 to drive the controller 51 to intersect with the optical axle L along a control path P, and a guiding hunk 53 to guide the controller 51 to move along a control path P. In this embodiment, the control path P is perpendicular to the optical axle L.

The power supply 52 comprises a vortex bar 521 and a motor 522 linking to the vortex bar 521. The guiding hunk 53 comprises a dovetail groove 531 for the controller 51 to be fixed. The controller 51 comprises a first groove 511 surrounding the first flexible member 42, a turbo bar 512 engaged with the vortex bar 521, and a dovetail protrusion 514 to fix the dovetail groove 531.

Figure 5:
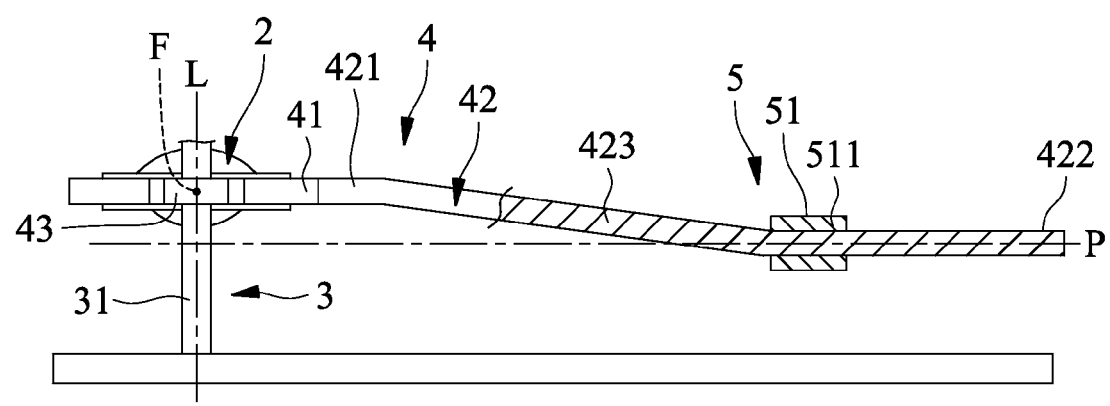
FIG. 5 is a lateral view showing a controller disposed at a control position closest to an optical axle.

Referring to FIGS. 4 and 5, the controller 51 moves between an initial position furthest away from the optical axle L and a control position closest to the optical axle L via the power supply 52.

Referring to FIG. 4, when the controller 51 is at the initial position, the controller 51 is disposed on the first outer section 422 of the first flexible member 42, the first middle controlling section 423 is sustained in a non-deformed state non-parallel to the control path P, and the first optical element 2 is disposed on an origin O on the optical axle L. In this embodiment, the first middle controlling section 423 in the non-deformed state is linear.

Referring to FIGS. 3 and 5, when the controller 51 moves from the initial position to the control position, the motor drives the vortex bar 521 to rotate further, to link the turbo bar 512 to move. Thus, the controller 51 moves from the first outer section 422 to the first middle controlling section 423 to force the first middle controlling section 423 to become deformed and the first optical element 2 is disposed on a focus adjustment point F on the optical axle L.

The controller 51 moves on the first flexible member 42 and the guiding hunk 53 along the control path P further, to force the first flexible member 42 to become deformed. Thus, the first optical element 2 moves between the origin O and the focus adjustment point F. The slope of the first middle controlling section 423 of the first flexible member 42 determines the displacement of the controller 51 and the first optical element 2.

Note that the first middle controlling section 423 in the non-deformed state may be nonlinear. That is, the curved shape of the first middle controlling section 423 can be adjusted to satisfy various requirements. The first optical element 2 may be an imaging sensor, for example, to fix an optical lens (not shown), and adjust the position of the imaging sensor on the optical axle L. The control path P and the optical axle L may generate other angles (not shown).

Figure 6:
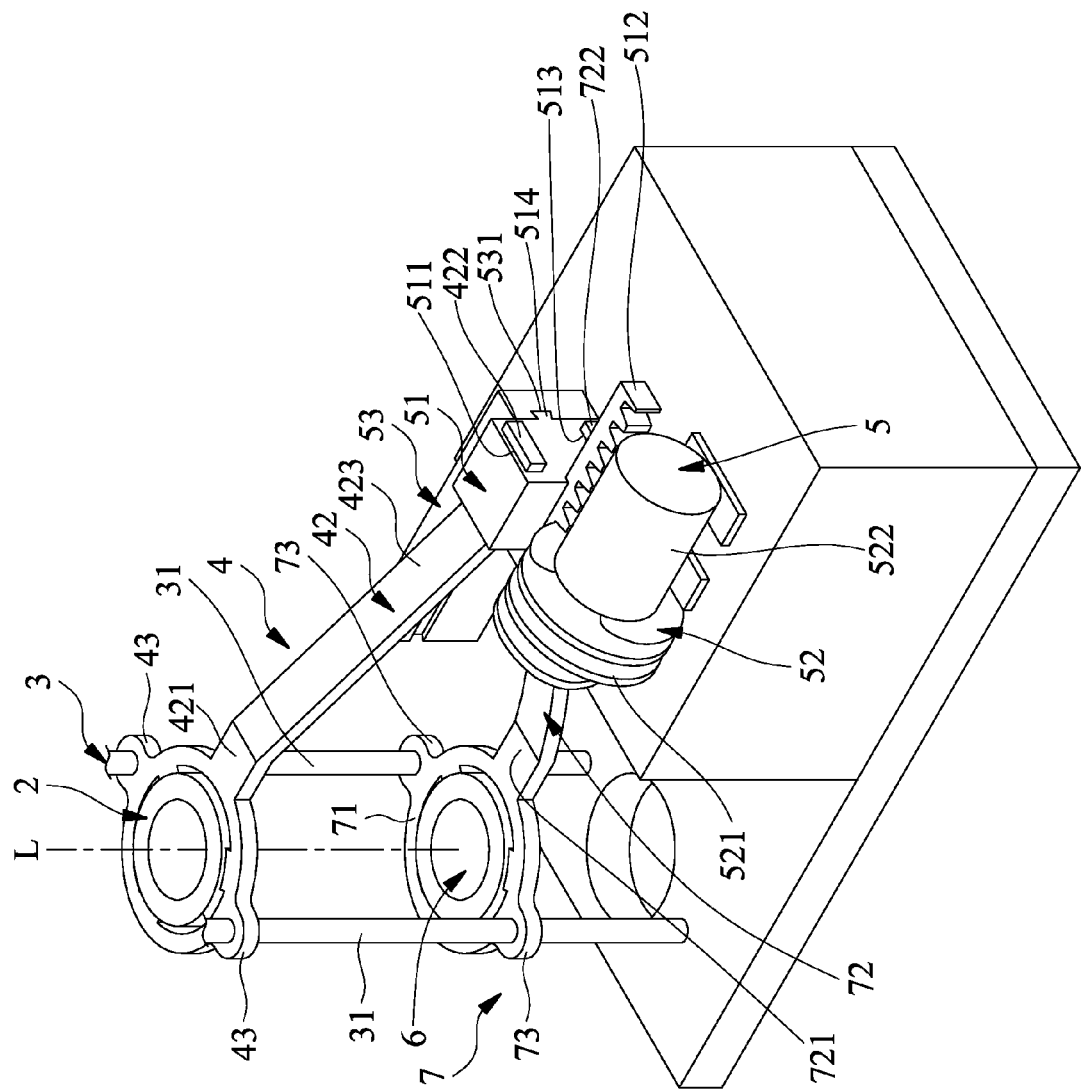
FIG. 6 is schematic view showing a focus adjustment module of another embodiment of the invention.
Figure 7:
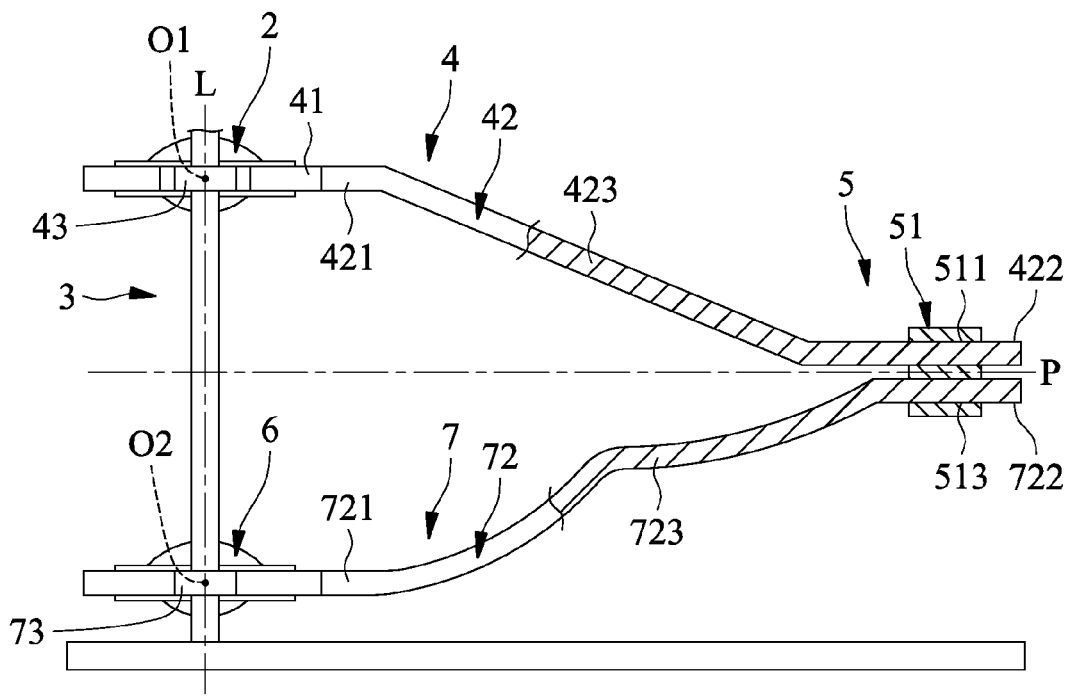
FIG. 7 is a lateral view showing a controller of another embodiment disposed at an initial position.
Figure 8:
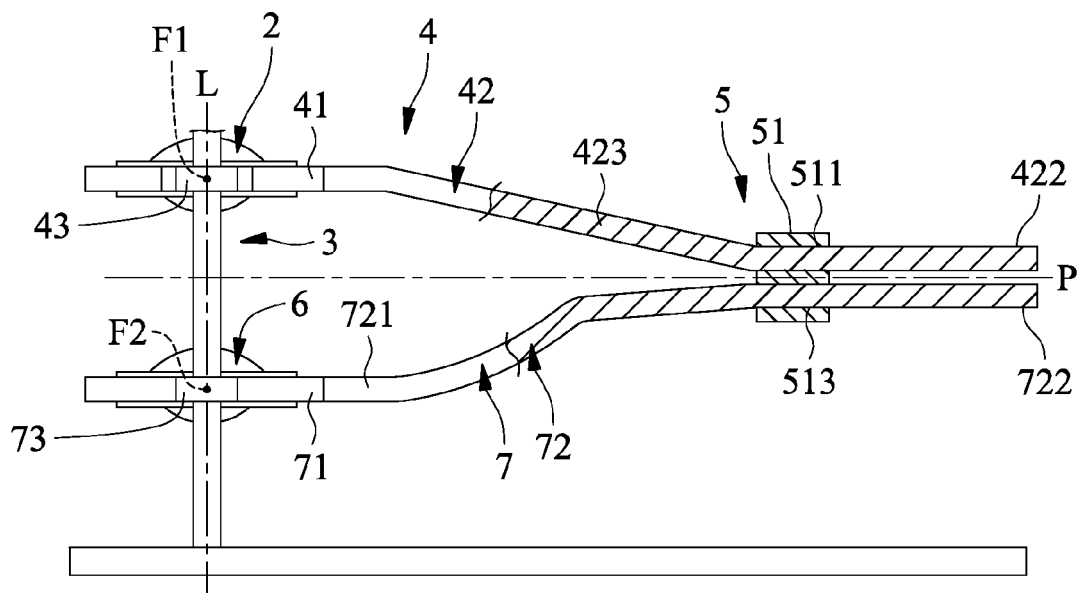
FIG. 8 is a lateral view showing a controller of another embodiment disposed at a control position.

Referring to FIGS. 6, 7 and 8, elements and assembly of another embodiment are similar to those of the above embodiment. The difference is that this embodiment further comprises a second optical element 6 and a second guiding unit 7.

In this embodiment, the second optical element 6 is an optical lens.

The second guiding unit 7 for guiding the second optical element 6 to move along the optical axle L comprises a second holder 71 for the second optical element 6 to be assembled thereon, a second flexible member 72 to connect to and drive the second holder 71, and a pair of second pivoting portions 73 on the second holder 71 opposite to the guiding axles 31.

The second flexible member 72 is a steel sheet and comprises a second inner section 721 to connect to the second holder 71, a second outer section 722 opposite to the second inner section 721 and a second middle controlling section 723 between the second inner section 721 and the second outer section 722.

The controller 51 of the control unit 5 fixes the second flexible member 72. That is, the controller 51 further comprises a second groove 513 surrounding the second flexible member 72.

The controller 51 moves between the initial position and the control position along the control path P. When the controller 51 is at the initial position, the controller 51 is disposed on the second outer section 722, the second middle controlling section 723 is sustained in a non-deformed state non-parallel to the control path P, and the second optical element 6 is disposed on a second origin O2 on the optical axle L. When the controller 51 is at the control position, the controller 51 moves from the second outer section 722 to the second middle controlling section 723 to force the second middle controlling section 723 to become deformed and the second optical element 6 is disposed on a second focus adjustment point F2 on the optical axle L.

FIG. 7 is a schematic view showing the first and the second optical elements 2 and 6 respectively disposed on a first origin O1 and the second origin O2 on the optical axle L. FIG. 8 is a schematic view showing the first and the second optical elements 2 and 6 respectively disposed on a first focus adjustment point F1 and the second focus adjustment point F2 on the optical axle L.

In this embodiment, the first middle controlling section 423 in the non-deformed state is linear. The second middle controlling section 723 in the non-deformed state is nonlinear.

Note that the first middle controlling section 423 in the non-deformed state may be nonlinear. The second middle controlling section 723 in the non-deformed state may be linear. The curved shapes of the first middle controlling section 423 and the second middle controlling section 723 are determined by requirements. The first and the second optical elements 2 and 6 may be other optical elements in addition to optical lenses (not shown).

In summary, the first and second flexible members 42 and 72 made of the steel sheet link the first and the second optical elements 2 and 6 to move along the optical axle L. Additionally, diversification of the focus adjustment module is increased by allowing adjustment of the curved shapes of the first middle controlling section 423 and the second middle controlling section 723. Also, by adding the first and second flexible members 42 and 72, the components and the linking relationship of the focus adjustment module are simplified. Thus, the focus adjustment module simultaneously provides zooming and focusing and achieves the purpose of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A focus adjustment module, comprising:
a first optical element, disposed along an optical axle;
a guiding track unit, parallel to the optical axle;
a first guiding unit, to guide the first optical element to move along the optical axle, comprising a first holder and a first flexible member, wherein the first holder fixes the guiding track unit and the first optical element is assembled on the first holder, the first flexible member connects to and drives the first holder, and the first flexible member comprises a first inner section to connect to the first holder, a first outer section opposite to the first inner section and a first middle controlling section between the first inner section and the first outer section; and
a control unit comprising a controller and a power supply, wherein the controller fixes the first flexible member, and the power supply drives the controller to intersect with the optical axle along a control path, wherein the controller moves between an initial position furthest away from the optical axle and a control position closest to the optical axle, and when the controller is at the initial position, the controller is disposed on the first outer section, the first middle controlling section is sustained in a non-deformed state non-parallel to the control path, and the first optical element is disposed on an origin on the optical axle, and when the controller is at the control position, the controller moves from the first outer section to the first middle controlling section to force the first middle controlling section to become deformed and the first optical element is disposed on a focus adjustment point on the optical axle.

2. The focus adjustment module as claimed in claim 1, wherein the guiding track unit comprises a pair of guiding axles, and the first guiding unit further comprises a pair of first pivoting portions on the first holder opposite to the guiding axles.

3. The focus adjustment module as claimed in claim 1, wherein the control path is perpendicular to the optical axle.

4. The focus adjustment module as claimed in claim 3, wherein the first flexible member is a steel sheet.

5. The focus adjustment module as claimed in claim 4, wherein the first middle controlling section in the non-deformed state is linear.

6. The focus adjustment module as claimed in claim 4, wherein the first middle controlling section in the non-deformed state is nonlinear.

7. The focus adjustment module as claimed in claim 3, wherein the power supply of the control unit comprises a vortex bar and a motor linking to the vortex bar, and the controller comprises a first groove surrounding the first flexible member and a turbo bar engaged with the vortex bar.

8. The focus adjustment module as claimed in claim 1, wherein the first optical element is an optical lens.

9. The focus adjustment module as claimed in claim 1, further comprising: a second optical element and a second guiding unit to guide the second optical element to move along the optical axle, wherein the second guiding unit comprises a second holder to cover the guiding track unit, the second optical element is assembled on the second holder, and a second flexible member is connected to and drives the second holder, and wherein the second flexible member comprises a second inner section, a second outer section is opposite to the second inner section and a second middle controlling section between the second inner section and the second outer section, and the controller of the control unit fixes the second flexible member and moves between the initial position and the control position, and when the controller is at the initial position, the controller is disposed on the second outer section, the second middle controlling section is sustained in a non-deformed state non-parallel to the control path, and the second optical element is disposed on a second origin on the optical axle, and when the controller is at the control position, the controller moves from the second outer section to the second middle controlling section to force the second middle controlling section to become deformed and the second optical element is disposed on a second focus adjustment point on the optical axle.

10. The focus adjustment module as claimed in claim 9, wherein the guiding track unit comprises a pair of guiding axles, the first guiding unit further comprises a pair of first pivoting portions on the first holder opposite to the guiding axles, and the second guiding unit further comprises a pair of second pivoting portions on the second holder opposite to the guiding axles.

11. The focus adjustment module as claimed in claim 9, wherein the control path is perpendicular to the optical axle.

12. The focus adjustment module as claimed in claim 11, wherein the first flexible member and the second flexible member are steel sheets.

13. The focus adjustment module as claimed in claim 11, wherein the first middle controlling section in the non-deformed state is linear.

14. The focus adjustment module as claimed in claim 11, wherein the first middle controlling section in the non-deformed state is nonlinear.

15. The focus adjustment module as claimed in claim 11, wherein the second middle controlling section in the non-deformed state is linear.

16. The focus adjustment module as claimed in claim 11, wherein the second middle controlling section in the non-deformed state is nonlinear.

17. The focus adjustment module as claimed in claim 9, wherein the power supply of the control unit comprises a vortex bar and a motor linking to the vortex bar, and the controller comprises a first groove surrounding the first flexible member, a second groove surrounding the second flexible member and a turbo bar engaged with the vortex bar.

18. The focus adjustment module as claimed in claim 9, wherein the first optical element and the second optical element are optical lenses.

* * * * *